(12) United States Patent
Dreibholz et al.

(10) Patent No.: US 6,962,549 B2
(45) Date of Patent: Nov. 8, 2005

(54) TRANSMISSION, PARTICULARLY AUTOMATIC TRANSMISSION, WITH SEVERAL SHIFTING ELEMENTS

(75) Inventors: Ralf Dreibholz, Meckenbeuren (DE); Gerhard Gumpoltsberger, Friedrichshafen (DE); Michael Ebenhoch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/650,225

(22) Filed: Aug. 28, 2003

(65) Prior Publication Data

US 2004/0072648 A1  Apr. 15, 2004

(30) Foreign Application Priority Data

Sep. 21, 2002  (DE) .................. 102 44 023

(51) Int. Cl.[7] .............................................. F16H 3/44
(52) U.S. Cl. ....................... 475/284; 475/325
(58) Field of Search ................ 475/284, 298, 475/303, 313, 325; 192/48.3–5, 48.8

(56) References Cited

U.S. PATENT DOCUMENTS

| 2,399,097 A | 4/1946 | Carnagua ................ 74/290 |
| 4,667,538 A | 5/1987 | Larsson ................ 74/785 |
| 5,073,160 A * | 12/1991 | Oshidari ................ 475/281 |
| 5,181,431 A * | 1/1993 | Zaiser et al. .............. 74/333 |
| 5,429,005 A * | 7/1995 | Fukui et al. .............. 74/325 |
| 5,718,148 A * | 2/1998 | Bender ................ 74/325 |
| 6,110,069 A * | 8/2000 | Taniguchi et al. .......... 475/330 |
| 6,176,802 B1 * | 1/2001 | Kasuya et al. ............ 475/269 |
| 6,669,596 B1 * | 12/2003 | Sefcik ................ 475/278 |
| 2002/0142880 A1 * | 10/2002 | Hayabuchi et al. ......... 475/275 |
| 2003/0228951 A1 * | 12/2003 | Haka ................ 475/303 |

FOREIGN PATENT DOCUMENTS

| DE | 34 44 5622 C2 | 12/1997 | .......... F16H 37/04 |
| DE | 199 10 299 C1 | 4/2001 | .......... F16H 3/62 |
| EP | 0 434 525 B1 | 7/1994 | .......... F16H 3/66 |
| EP | 0 810 393 A2 | 12/1997 | .......... F16H 63/30 |
| JP | 406323377 A * | 11/1994 | |

* cited by examiner

*Primary Examiner*—Roger Pang
(74) *Attorney, Agent, or Firm*—Davis & Bujold, P.L.L.C.

(57) ABSTRACT

A transmission is described, in particular an automatic transmission, which has several shift control elements (A, B, C, D, E) and several gearwheels (2, 3) which can be engaged via the shift control elements (A to E) to form a power flow, in which, to establish a transmission ratio in each case at least one of the shift control elements (A to E) is closed. The shift control elements (B, C, E), which are engaged during an up-shift, are formed as frictional shift control elements, and the shift control elements (A, D), which during up-shifts respectively only constitute a shift control element to be disengaged, are made as positive-locking gear elements.

20 Claims, 5 Drawing Sheets

| | A | B | E | C | D | i |
|---|---|---|---|---|---|---|
| 1 | ● | | | | ● | 4,16 |
| 2 | ● | | | ● | | 2,37 |
| 3 | ● | ● | | | | 1,56 |
| 4 | ● | | ● | | | 1,15 |
| 5 | | ● | ● | | | 0,86 |
| 6 | | | ● | ● | | 0,69 |
| R | | ● | | | ● | -3,45 |

Fig. 3

| | F | G | H | I | K | L | M | i |
|---|---|---|---|---|---|---|---|---|
| 1 | ● | | | | | O | | 7,39 |
| 2 | | ● | ● | | | O | | 4,83 |
| 3 | | | | | | O | | 3,02 |
| 4 | ● | | | | ● | | | 2,01 |
| 5 | | ● | | | ● | | | 1,32 |
| 6 | | | | ● | ● | | | 1,00 |
| 7 | | | ● | | ● | | | 0,82 |
| R1 | ● | ● | | | | | O | -6,93 |
| R2 | | | | | | | O | -4,53 |
| R3 | | | ● | | | | O | -2,83 |

TRANSMISSION, PARTICULARLY AUTOMATIC TRANSMISSION, WITH SEVERAL SHIFTING ELEMENTS

FIELD OF THE INVENTON

The invention concerns a transmission, in particular an automatic transmission.

BACKGROUND OF THE INVENTION

From DE 199 10 299 C1 a planetary gear shift mechanism is known, in which an input shaft can be brought into driving engagement with an output shaft by at least one of three planetary gear divided transmissions. Using three respective friction couplings and brakes, five forward gears including one with transmission ratio 1 corresponding to direct throughput can be engaged. By interrupting a particular drive connection between two of the three divided transmissions an additional, sixth forward gear can be obtained. Alternatively, the additional sixth forward gear can be obtained by means of additional auxiliary planetary elements and an additional, outer auxiliary central gearwheel which meshes with the latter, such that the auxiliary central gearwheel can be braked by an additional brake in the sixth forward gear. In a different embodiment this auxiliary central gearwheel also provides a seventh forward gear and an additional reverse gear.

From EP 0 434 525 B1 an automatic multiple-speed transmission for vehicles is known, which consists of several planetary gearwheel assemblies which are engaged by means of friction elements such as clutches and brakes and are usually connected with a starting element subjected to a slip effect and optionally provided with a bridging coupling, such as a hydraulic torque converter or a fluid coupling.

Such automatic transmissions, however, have the disadvantage that all the shift control elements are in the form of multiple-disc couplings or brakes, which take up a lot of structural space and are very costly.

The purpose of the present invention is to provide a transmission of the type described at the beginning, which takes up little space and can be manufactured inexpensively.

SUMMARY OF THE INVENTION

According to the invention, by virtue of the fact that the shift control elements in the transmission that are engaged when shifting up a gear are formed as frictional shift control elements, and the shift control elements which, when shifting up, each constitute only a shift control element to be disengaged, are each made as form-locking shift control elements. A transmission is provided in this case which, compared with the transmissions known from the prior art, takes up less structural space and can be manufactured less expensively, since the transmission has fewer friction elements and pressure regulators.

An additional advantage compared with the transmissions known from the prior art, is that a transmission designed according to the invention, has essentially lower drag losses due to unclosed frictional shift control elements, such as multiple-disc couplings or multiple-disc brakes.

Advantageously, according to the invention, the use of a transmission in a vehicle in which frictional shift control elements are replaced by positive-locking shift control elements, results in improved acceleration since the positive-locking elements are more compact and lighter.

Furthermore, according to the invention, the transmission has the advantage that between the components of the positive-locking shift control elements that are to be brought into mutual engagement, no transmission oil is present to produce drag torques due to fluid friction, as happens between the discs of a disc pack of frictional shift elements. The elimination or reduction of drag torques in the area of the positive-locking shift control elements advantageously leads to lower fuel consumption.

A further advantage resulting from the positive-locking shift control elements is that in general higher drive torques can be transmitted by positive-locking than by frictional shift control elements without having to apply a high holding or closing pressure for the positive-locking shift control elements by means of a hydraulic system.

BRIEF DESCRIPTION OF THE DRAWINGS

The invention will now be described, by way of example, with reference to the accompanying drawings in which:

FIG. 3 is a gear-shift scheme of the shift control elements of the gear arrangements of FIGS. 1 and 2;

FIG. 5 is a gear-shift scheme of the shift control elements of the gear arrangement of FIG. 4.

DETAILED DESCRIPTION OF THE INVENTION

Figure 1:
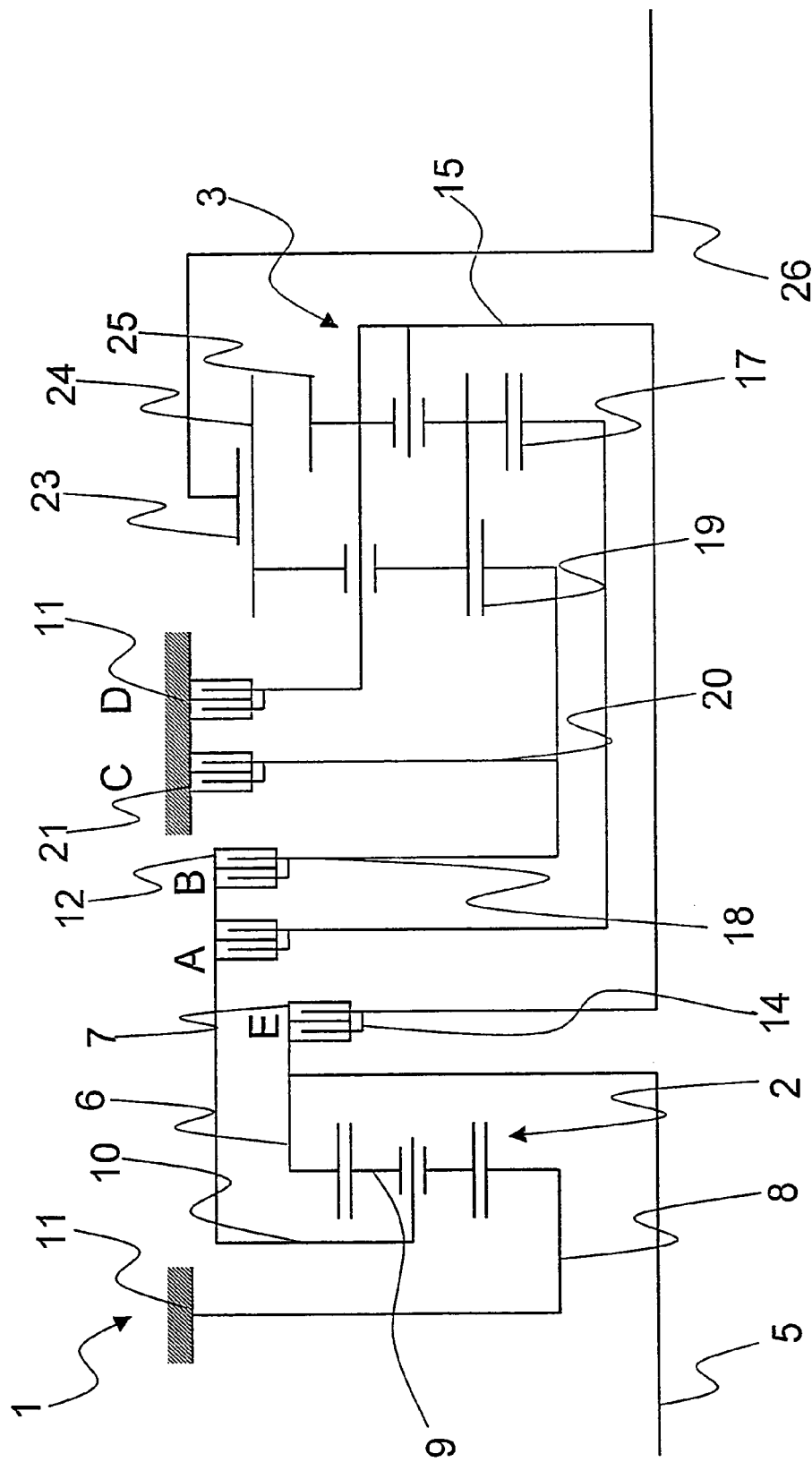
FIG. 1 is a schematic gearwheel arrangement of an automatic transmission known from the prior art.
Figure 2:
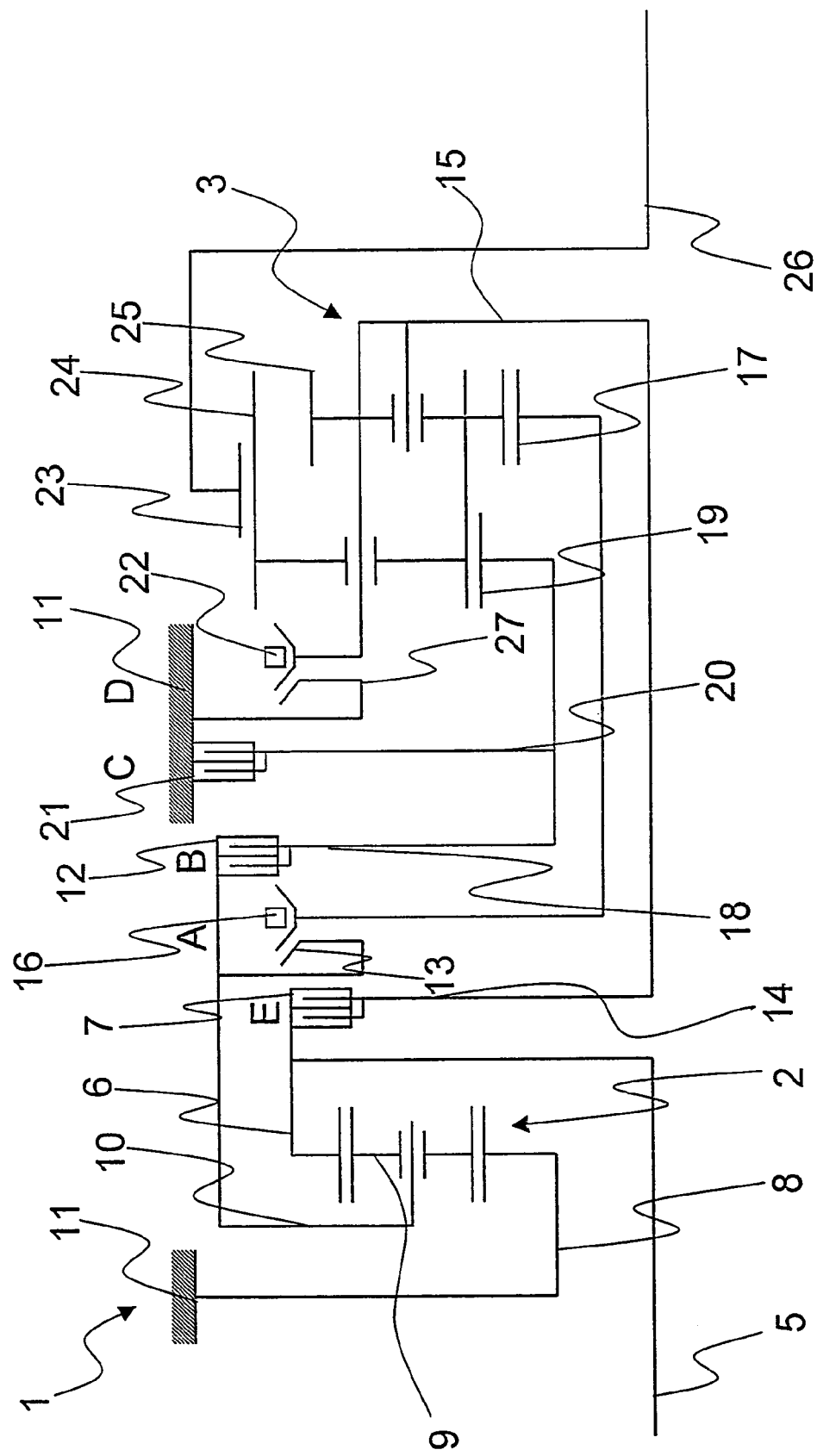
FIG. 2 is a schematic gearwheel arrangement of a planetary transmission according to the invention.

Referring to FIGS. 1 and 2, in each case a schematic gearwheel arrangement 1 of an automatic or planetary transmission, respectively, is shown, which has on the transmission input side a first planetary gearwheel assembly 2 and on the transmission output side a second planetary gearwheel assembly 3.

The second planetary gearwheel assembly 3 is made as a dual planetary gearwheel assembly and constitutes a so-termed Ravigneaux assembly. Between the two planetary gearwheel assemblies 2, 3 are five shift control elements designated A, B, C, D and E and, in each case, two of these shift control elements must be closed to establish a transmission ratio of the planetary transmission.

The schematic gearwheel arrangement of FIG. 1 corresponds essentially to that of FIG. 2, but all the shift control elements A to E of the arrangement 1 in FIG. 1 are made as frictional shift control elements. In the gearwheel arrangement 1 of FIG. 2, shift control elements A and D are positive-locking shift control elements while shift control elements B, C and E are frictional ones.

In the planetary transmission, illustrated schematically by the gearwheel arrangement 1 in FIGS. 1 and 2, six forward gears and one reverse gear can be engaged. Shown in FIG. 3, the more detailed gear-shift scheme indicates the relationship between the individual transmission ratio steps and the shift control elements A, B, C, D and E.

Figure 3:
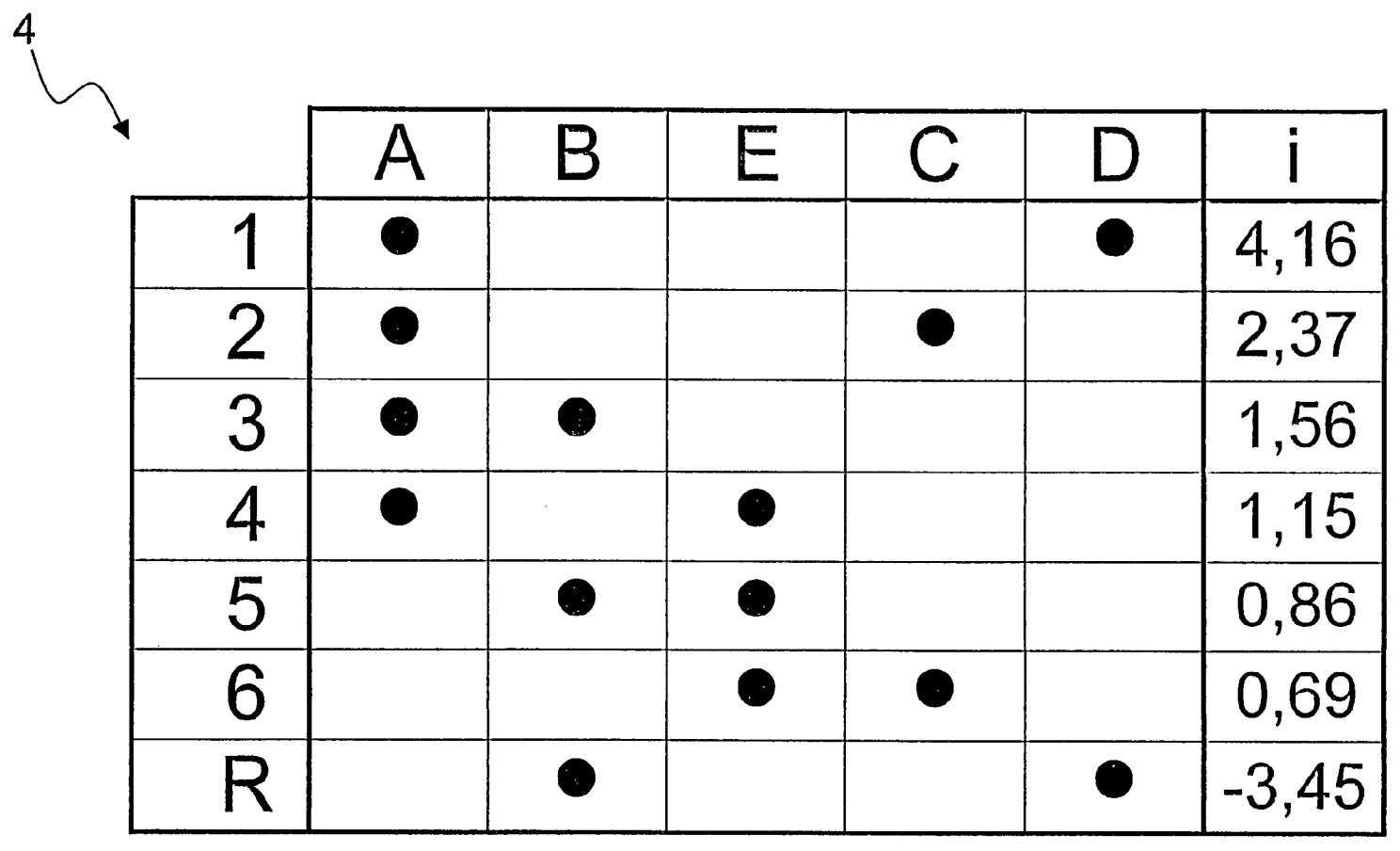

The gear-shift scheme 4 of FIG. 3 is shown in the form of a table, in whose first column the individual gear steps "1", "2", "3", "4", "5", "6" and "R" are entered. In the first row of Table 4 are entered the individual shift control elements A to E and an overall transmission ratio i of the planetary transmission when the respective gears are engaged.

From the gear-shift scheme 4, it is apparent that, for example, to engage the first ratio "1" shift control elements A and D are closed and at the same time, shift control elements B, C and E are in the open condition. The transmission ratio then engaged is 4.16. For a shift upwards from first gear "1" to second gear "2", shift control element A remains closed and shift control element C is engaged as well, while shift control element D is disengaged. The engagement of the shift control element C formed as a multiple-disc coupling takes place with a slip phase of the shift control element C to equalize a speed difference in the transmission.

Gear-shift Table 4 also shows that for each of the gears "1" to "4" shift control element A remains closed, while shift control elements D, C, B or E, respectively, are used as the other shift element to engage the corresponding transmission ratio of the planetary transmission. The shift control elements which are closed in order to engage a gear are indicated in Table 4 by a black spot, and the cells of Table 4 without spots in them denote shift control elements which are open in the corresponding cases.

From the gear-shift scheme 4 it can be deduced that neither shift control element A nor shift control element D are engaged during an up-shift while, in contrast, shift control element B is engaged when shifting up from gear "2" to gear "3", shift control element "C" when shifting up from gear "1" to gear "2", and shift control element "E" when shifting up from gear "3" to gear "4".

Moreover, it can be seen from the gear-shift scheme of FIG. 3 that during a down-shift neither of the shift control elements A and D is in the power transmission path of the planetary system in the higher gear, but is disengaged on transition to the lower gear.

In the present case, during an up-shift any shift control element which is engaged in order to produce the new, higher gear equalizes speed differences in the planetary transmission by means of a so-termed slip function. During down-shifts, speed differences in the planetary transmission are equalized by the slip operation of those shift control elements which are, at first, closed in order to engage the higher gear and, when there is speed equality at the shift control element to be engaged for the new, lower gear, are disengaged while the new shift control element is at the same time engaged without a slip phase.

For that reason, it is advantageously possible to make the shift control elements A and D of the gearwheel arrangement 1, according to FIG. 2, as positive-locking shift control elements, since neither during an up-shift nor during a down-shift does a speed difference in the planetary transmission have to be equalized by a slip phase of either of those shift control elements.

The speed differences compensated during a gear shift in the planetary transmission, are respectively equalized by the shift control elements being engaged during an up-shift and by the shift control elements being disengaged during a down-shift. Consequently, only shift control elements B, C and E must necessarily be made as frictional shift control elements, preferably as multiple-disc couplings or multiple-disc brakes. Shift control elements which are not called upon to equalize speed differences in the planetary transmission or only small ones, i.e., the shift control elements A and D in the present case, can be made as positive-locking shift control elements, preferably as claw couplings or synchromesh devices of a structure known as such.

This ensures, on the one hand, in particular, that traction up-shifts and traction down-shifts can be carried out as change-under-load shifts without interruption of the traction and, on the other hand, that drag losses are reduced, due to unclosed frictional shift control elements such as multiple-disc couplings or brakes. Thanks to this reduction of drag losses, the fuel consumption of a motor vehicle can be reduced advantageously when a planetary transmission, according to FIG. 2, is used in a drive train in place of a planetary transmission according to FIG. 1.

In this, during a traction up-shift such as from first gear "1" to second gear "2", the frictional shift control element C, formed as a frictional multiple-disc coupling, is closed in a controlled way, so that it slowly takes up the force flow during a slip phase and so equalizes the speed difference, whereas the shift control element D made as a synchromesh device is disengaged without any slip phase when speed equality has been established.

During a down-shift from second gear "2" to first gear "1", the shift control element C is opened slowly and operates in a slipping condition. This gives the possibility of increasing the speed of a drive aggregate which, in the context of the power train of a motor vehicle, is preferably an internal combustion engine. With this procedure, an operating point of the transmission is approached at which the speed difference at the shift control element D is zero or at which the components of the element D to be brought into positive-locking engagement have the same speed, so that the shift control element D can be closed and engaged by meshing without any slip phase.

The operation of the planetary transmission, according to the invention, will be described in more detail below, with reference to the schematic gearwheel arrangement of FIG. 2.

Via a transmission input shaft 5, a transmission input torque is applied to an annular gearwheel 6 of the first planetary gearwheel assembly 2. The annular gearwheel 6 is connected to an outer disc carrier 7 of the shift control element E, the latter being formed as a frictional multiple-disc coupling. Between a solar gearwheel 8 of the first planetary gearwheel assembly 2 and the annular gear 6 of the said first planetary gearwheel assembly 2 there rotate planetary gearwheels 9 which are mounted on a planetary gearwheel support 10. The solar gearwheel 8 of the first planetary gearwheel assembly 2 is connected fast to a transmission housing 11 schematically indicated.

The planetary gearwheel support 10 of the first planetary gearwheel assembly 2 is connected to an outer disc carrier 12 of the shift control element B, which is preferably made as a multiple-disc coupling and with a component 13 of the shift control element A.

An inner disc carrier 14 of the shift control element E is connected to a planetary gearwheel support 15 of the second planetary gearwheel assembly 3, so that when the shift control element E is closed, the force flow from the transmission input shaft 5 is passed directly, via the planetary gearwheel support 15 of the second planetary gearwheel assembly 3, to the said second planetary gearwheel assembly 3.

The shift control element A which, in the present case, is made as a synchromesh device, in addition to the component 13 which, in this case, is preferably a synchronizing ring with matching cone and locking indentation, preferably also has a gearshift sleeve 16 with internal claw indentation and a ring groove. The internal claw indentation of the gearshift sleeve 16 can be brought into engagement with the component 13 so as to close the shift control element A. A further locking indentation of the shift control element A, with which the inner claw indentation of the gearshift sleeve is in permanent engagement, is connected to a small sunwheel 17 of the second planetary gearwheel assembly 3 so that the planetary gearwheel support 10 of the first planetary gearwheel assembly is connected fast to the small sunwheel 17 of the second planetary gearwheel assembly when the shift control element A is closed.

Furthermore, an inner disc carrier 18 of the shift control element B is connected to a large sunwheel 19 of the planetary gearwheel assembly 3. Accordingly, when the shift control element B is closed, an input torque of the planetary transmission is transferred from the transmission input shaft 5, via the annular gearwheel 6, the planetary gearwheels 9 and the planetary gearwheel support 10 of the first planetary gearwheel assembly, directly to the large sunwheel 19 of the second planetary gearwheel assembly. In addition, the large sunwheel 19 of the second planetary gearwheel assembly 3 is connected fast to an inner disc carrier 20 of the shift control element C, which is made as a multiple-disc brake. An outer disc carrier 21 of the shift control element C is connected fast to the transmission housing 11. It follows that when the shift control element C is closed, the large sunwheel 19 is connected solidly to the transmission housing 11.

In this case the shift control element D is also made as a synchromesh device, such that a component 27 of the shift control element D preferably made as a synchronizing ring with matching cone and locking indentation is connected fast to the transmission housing 11. A gearshift sleeve 22 of the shift control element D, preferably made with inner claw indentation and a ring groove, is connected to the planetary gearwheel support 15 of the second planetary gearwheel assembly.

Between the large sunwheel 19 and an annular gearwheel 23 of the second planetary gearwheel assembly 3, there roll wide planetary gearwheels 24. Between the small sunwheel 17 of the second planetary gearwheel assembly 3 and the wide planetary gearwheels 24, there roll narrow planetary gearwheels 25, so that the wide planetary gearwheels 24 and the narrow planetary gearwheels 25 are both held by the planetary gearwheel support 15 of the second planetary gearwheel assembly 3. The annular gearwheel 23 of the second planetary gearwheel assembly 3 is connected to a transmission output shaft 26.

With the first planetary gearwheel assembly 2 and the planetary transmission component, appropriate actuation of the shift control elements E, and the shift control elements A and B can branch the power of the transmission input torque along two drive paths of the transmission. At the second planetary gearwheel assembly 3, in contrast to the first planetary gearwheel assembly 2, which is designed as a power-branching element, power summation takes place in such manner that a divided transmission input torque transformed appropriately for the transmission ratio engaged in each case, is summed and transferred to the transmission output shaft 26.

Figure 4:
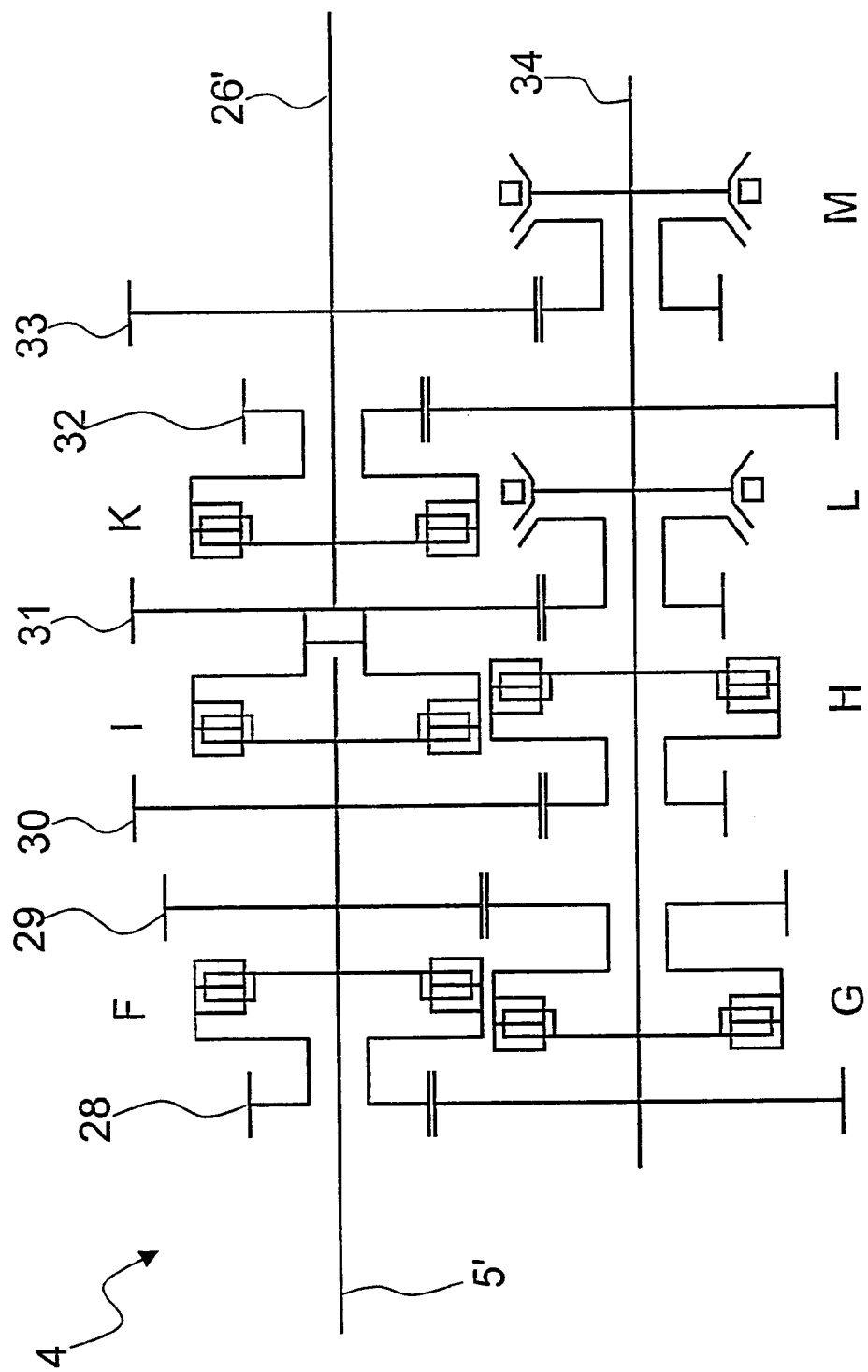
FIG. 4 is a schematic gearwheel arrangement of a change-under-load countershaft transmission according to the invention.

FIG. 4 shows another schematic gearwheel arrangement 1' of a change-under-load countershaft transmission, as a further embodiment of a transmission, according to the invention, which is composed of several spur gear pairs 28 to 33 and several shift control elements F, G, H, I, K, L and M.

The shift control elements of the change-under-load countershaft transmission are provided for the engagement or disengagement of the respective corresponding spur gear steps 28 to 33, the shift control elements F, G, H, I, K being formed as frictional shift control elements and the elements L, M as positive-locking shift control elements.

In the change-under-load countershaft transmission seven forward gears and three reverse gears can be engaged, and the gear-shift scheme 4', shown in FIG. 5, indicates the relationship between the individual transmission ratio steps and the shift control elements of the change-under-load countershaft transmission. The tabular structure of the gear-shift scheme 4' in FIG. 5 corresponds essentially to that of the gear-shift scheme 4 in FIG. 3.

To engage a transmission ratio of the change-under-load countershaft transmission, in each case two of the shift control elements are closed in order to transfer the drive torque of the engine from the transmission input shaft 5', via the countershaft 34 to the transmission output shaft 26'. Only in gear "6" is the drive torque transferred directly from the transmission input shaft 5' to the transmission output shaft 26' via the shift control element I. When gear "6" is engaged, the gear-shift scheme 4 shows that shift control element K is also closed.

Since, when gear "6" in the change-under-load countershaft transmission is engaged, none of the shift control elements F, G, H or L is closed, no torque is transferred to the countershaft 34 which could flow from the countershaft 34 via the spur gear step 32 to the transmission output shaft 26'. Thus, when gear "6" is engaged the shift control element K is closed, in order to avoid further shift processes of the shift control element K when up-shifting from gear "6" to gear "7" or down-shifting from gear "6" to gear "5", since the shift control element K is used to engage both of the gears "5" and "7" and must, therefore, remain closed.

Accordingly, a shift process to open the shift control element K and another to close it are avoided.

The gear-shift scheme 4' shows that, for example, to engage first gear or the first transmission ratio "1", the shift control elements F and L are closed and, at the same time, the shift control elements G, H, I, K and M are in the open condition. The transmission ratio engaged is then 7.39. When shifting up from first gear "1" to second gear "2", shift control element L remains closed and shift control element G is engaged while, at the same time, shift control element F is disengaged. The engagement of the shift control element G constructed as a multiple-disc coupling takes place with a slip phase of the shift control element G to equalize a speed difference in the transmission.

Furthermore, the gear-shift scheme 4' shows that the shift control element L is closed when any of gears "1" to "3" is engaged and that, respectively, shift control element G or H is used as the other shift control element for engaging the corresponding transmission ratio of the change-under-load countershaft transmission. The shift control elements that are closed in order to engage particular gears are denoted in the gear-shift scheme 4' by a black spot or a circle, while the cells in the gear-shift scheme 4' which have no spot or circle denote the shift control elements which are, in each case, open when the corresponding gear or transmission ratio is engaged.

Furthermore, the gear-shift scheme 4' shows that neither shift control element L nor shift control element M are engaged when shifting up while, in contrast, the shift control elements F, G, H, I and K are all engaged in the force flow of the change-under-load countershaft transmission during various up-shifts.

In addition, it can be seen from the gear-shift scheme of FIG. 5 that when a down-shift takes place, shift control elements L and M are the ones which, respectively, are in the force flow path of the change-under-load countershaft transmission in the higher gear and are disengaged on shifting to the lower gear.

As in the planetary transmission described in FIG. 2, during up-shifts in this change-under-load countershaft transmission speed differences in the said transmission are equalized by the slip operation of those shift control elements of the said transmission which are being engaged in order to establish the new, higher gear. During down-shifts, speed differences in the change-under-load countershaft transmission are equalized by the slip operation of at least one of the shift control elements which are at first closed in order to engage the higher gear and, when speed equality has been established at the shift control element or elements to be engaged for the new, lower gear, are disengaged while the new shift control element or elements is/are at the same time engaged without a slip phase.

Accordingly, it is advantageously possible to make the shift control elements L and M of the gearwheel arrangement 1' according to FIG. 5 as positive-locking shift control elements since, with appropriate control of the transmission, neither during an up-shift nor during a down-shift are speed differences in the transmission equalized by a slip phase of the shift control elements L and M.

The speed differences equalized during a gear shift in the change-under-load countershaft transmission, are respectively equalized during an up-shift by the shift control element being engaged and during a down-shift by the shift control element being disengaged. Consequently, only the shift control elements F, G, H, I and K must necessarily be made as frictional shift control elements, preferably multiple-disc couplings or brakes. Shift control elements by which no, or only small speed differences in the change-under-load countershaft transmission have to be equalized as necessary, i.e., in the present case, the shift control elements L and M, can be made as positive-locking gear elements, preferably as claw clutches or synchromesh devices in a manner known as such.

This allows the advantageous possibility of carrying out up-shifts and down-shifts as changes-under-load without interruption of the traction force and, at the same time, reducing drag losses due to unclosed frictional shift control elements or multiple-disc couplings. The reduction of drag losses again leads to reduced fuel consumption of a motor vehicle when a change-under-load countershaft transmission is used in a drive train of the motor vehicle according to FIG. 4.

The shift control elements A to E of the planetary transmission or the shift control elements F, G, H, I, K, L, M of the change-under-load countershaft transmission, according to the invention in the present case, can be actuated hydraulically, but it is obviously conceivable by those with knowledge of the field that, alternatively, the shift control elements should be controlled by some appropriate mechanical actuation system. In addition, the positive-locking shift control elements A and D of the planetary transmission and the positive-locking shift control elements L and M of the change-under-load countershaft transmission are preferably made such that they can transmit an applied torque in both rotation directions in the closed condition.

In an embodiment of the transmission, according to the invention, it is provided that at least one of the frictional shift control elements of the planetary transmission or the change-under-load countershaft transmission serves as a starting element, which makes it possible to do without a conventional starting element, such as a hydrodynamic converter, a frictional starting clutch located before or after the transmission, or any suchlike.

The present invention is in a general sense applicable to automatic transmissions made with several shift control elements and several gearwheels that can be engaged via the shift control elements in a power flow. These engageable and disengageable gearwheels or gearwheel pairs can be made as a planetary gearwheel assembly or assemblies, as spur gear stages, or as a combination of at least one planetary gearwheel assembly and one spur gear stage, such that to establish a transmission ratio in the transmission at least one of the transmission's shift control elements is closed.

In particular, the second planetary gearwheel assembly of the planetary transmission shown in FIGS. 1 and 2 can be replaced by a spur gear stage, or the spur gear stages of the change-under-load countershaft transmission by one or more planetary gearwheel assemblies.

Moreover, the present invention is not limited to the arrangement of shift control elements, planetary gearwheel assemblies and spur gear stages represented in FIG. 1, FIG. 2 and FIG. 4.

What is claimed is:

1. An automatic transmission comprising:
a plurality of shift control elements (A, B, C, D, E; F, G, H, I, K, L, M) and gearwheels (2, 3; 28 to 33) which can be engaged by the shift control elements to form a power flow through the transmission;
a transmission ratio established by engaging at least one of the shift control elements (A to E; F, G, H, I, K, L, M); and
a first group of the shift control elements (B, C, E; F, G, H, K) being frictional shift control elements with at least one of the first group of the shift control elements being engaged for an up-shift from first gear, and a second group of the shift control elements (A, D; L, M), which are positive-locking shift control elements, and for engagement of first gear, only two of the positive-locking shift control elements (A, D; L, M) of the second group are engaged, and for upshifts from first gear the positive-locking shift control elements (A, D; L, M) are only selectively disengaged.

2. The automatic transmission according to claim 1, further comprising at least one of a planetary gearwheel assembly (2, 3) and a spur gear stage (28 to 33).

3. The automatic transmission according to claim 1, wherein
the up-shift can be carried out as a powershift.

4. The automatic transmission according to claim 1, wherein the positive-locking shift control elements (A, D; L, M) can be engaged to transmit torque in both rotation directions.

5. The automatic transmission according to claim 1, wherein at least one of the positive-locking shift control elements (A and D; L and M) is a claw coupling.

6. The automatic transmission according to claim 1, wherein at least one of the positive-locking shift control elements (A and D; L and M) is a synchromesh device.

7. The automatic transmission according to claim 1, wherein the positive-locking shift control elements (A and D; L and M) are actuated one of mechanically and hydraulically.

8. The automatic transmission according to claim 1, wherein at least one of the plurality of shift control elements (C, D) is a brake.

9. The automatic transmission according to claim 1, further comprising at least one multiple-shaft planetary transmission (2, 3) in which one of a power split and a power summation takes place so that a defined transmission ratio can be established.

10. The automatic transmission according to claim 9, wherein the at least one multiple shaft planetary transmission (3) is formed as a dual planetary gearwheel assembly.

11. The automatic transmission according to claim 1, wherein the shift control elements (B, C, E; F, G, H, I, K) which are engaged during a up-shift and are disengaged during a down-shift, are formed as frictional shift control elements.

12. An automatic transmission comprising:
- a plurality of shift control elements (A, B, C, D, E; F, G, H, I, K, L, M) and gearwheels (2, 3; 28 to 33) which can be engaged by the shift control elements to form a power flow through the transmission;
- a transmission ratio established by engaging at least one of the shift control elements (A to E; F, G, H, I, K, L, M); and
- a first group of the shift control elements (B, C, E; F, G, H, K) being frictional shift control elements and a second group of the shift control elements (A, D; L, M) being positive-locking shift control elements; for engagement of first gear, only two of the positive-locking shift control elements (A, D; L, M) of the second group are engaged, and for each sequential upshift from first gear, (1) only two of the shift control elements (A to E; F, G, H, I, K, L, M) are engaged, (2) only a single previously engaged shift control element (A to E; F, G, H, I, K, L, M) remains engaged for a next subsequent higher gear, and (3) the other previously engaged shift control element (A to E; F, G, H, I, K, L, M) is disengaged and only one other shift control element (A to E; F, G, H, I, K, L, M) is engaged for the next subsequent higher gear.

13. The automatic transmission according to claim 12, further comprising at least one of a planetary gearwheel assembly (2, 3) and a spur gear stage (28 to 33), and the up-shift can be carried out as a powershift.

14. The automatic transmission according to claim 12, wherein the positive-locking shift control elements (A, D; L, M) can be engaged to transmit torque in both rotation directions.

15. The automatic transmission according to claim 12, wherein at least one of the positive-locking shift control elements (A and D; L and M) is one of a claw coupling and a synchromesh device.

16. The automatic transmission according to claim 12, wherein the positive-locking shift control elements (A and D; L and M) are actuated one of mechanically and hydraulically.

17. The automatic transmission according to claim 12, wherein at least one of the plurality of shift control elements (C, D) is-a brake.

18. The automatic transmission according to claim 12, further comprising at least one multiple-shaft planetary transmission (2, 3) in which one of a power split and a power summation takes place so that a defined transmission ratio can be established; and
the at least one multiple shaft planetary transmission (3) is formed as a dual planetary gearwheel assembly.

19. The automatic transmission according to claim 12, wherein the shift control elements (B, C, E; F, G, H, I, K) which are engaged during a up-shift and are disengaged during a down-shift, are formed as frictional shift control elements.

20. An automatic transmission comprising:
- a plurality of shift control elements (A, B, C, D, E; F, G, H, I, K, L, M) and gearwheels (2, 3; 28 to 33) which can be engaged by the shift control elements to form a power flow through the transmission;
- a transmission ratio established by engaging at least one of the shift control elements (A to E; F, G, H, I, K, L, M); and
- a first group of the shift control elements (B, C, E; F, G, H, K) being frictional shift control elements and a second group of the shift control elements (A, D; L, M) being positive-locking shift control elements; for engagement of first gear, only two of the positive-locking shift control elements (A, D; L, M) of the second group are engaged, and for each sequential upshift from first gear, (1) only two of the shift control elements (A to E; F, G, H, I, K, L, M) are engaged, (2) only a single previously engaged shift control element (A to E; F, G, H, I, K, L, M) remains engaged for a next subsequent higher gear, and (3) the other previously engaged shift control element (A to E; F, G, H, I, K, L, M) is disengaged and only one other shift control element (A to E; F, G, H, I, K, L, M) is engaged for the next subsequent higher gear; and
- during each down-shift from a highest gear to the first gear, only the frictional shift control elements of the first group of the shift control elements (B, C, E; F, G, H, K) being disengaged.

* * * * *